(12) United States Patent
Dechamps (10) Patent No.: US 7,349,121 B2
(45) Date of Patent: Mar. 25, 2008

(54) METHOD FOR AUTOMATICALLY DETERMINING AN IMPOSITION PLAN

(75) Inventor: Jozef Dechamps, Mortsel (BE)

(73) Assignee: Agfa Graphics NV, Mortsel (BE)

( * ) Notice: Subject to any disclaimer, the term of this patent is extended or adjusted under 35 U.S.C. 154(b) by 1126 days.

(21) Appl. No.: 10/629,355

(22) Filed: Jul. 29, 2003
(Under 37 CFR 1.47)

(65) Prior Publication Data
US 2004/0218217 A1 Nov. 4, 2004

Related U.S. Application Data

(60) Provisional application No. 60/411,729, filed on Sep. 18, 2002.

(30) Foreign Application Priority Data
Aug. 2, 2002 (EP) .................................. 02102092

(51) Int. Cl.
*G06F 15/00* (2006.01)
*G06K 1/00* (2006.01)
(52) U.S. Cl. .................... 358/1.5; 358/1.5; 358/1.9
(58) Field of Classification Search ................ 358/1.1, 358/1.5, 1.9, 1.12
See application file for complete search history.

(56) References Cited

U.S. PATENT DOCUMENTS 5,159,682 A 10/1992 Toyonaga et al.
6,046,818 A 4/2000 Benson

FOREIGN PATENT DOCUMENTS

EP 0310765 4/1989

WO WO01/025907 4/2001

OTHER PUBLICATIONS

Seybold publication, vol. 30, No. 6, Nov. 27, 2000 titled "Planning For Print: ScenicSoft's UpFront".
JDF Specification, Release 1.0, CIP4 Organization, pp. iii, 220, 276-282.
Harland Simon, "Printing Industry Management and Automation", ESPRIT, pp. 1-24.
Harland Simon, "ESPRIT—automatic imposition generator", 13 page printout from www.harlandsimon.com/print_production/print_product_esprit.html.
"Newspapers and Technology" Jun. 2000, 2 page printout from www.newsandtech.com/issues/2000/06-00/nexpo2000/companies/06-00_h.htm.
Harland Simon Press Release dated Oct. 25, 2001, 2 page printout from www.harlandsimon.com/news/news_main.html.
Harland Simon press release "Success Stories", 3 page printout from www.harlandsimon.com/news/news_success.html.
NEXPO2002, "On the Floor Monday" newsletter of the nexpo2002 trade show, 2 page printout from www.naa.org/conferences/nexpo2002/monday_onthefloor.html.
CIP4 committee, JDF Specification Release 1.0, published on Apr. 10, 2004, 9 page printout from www.cip4.org.

*Primary Examiner*—Gabriel Garcia
*Assistant Examiner*—Thierry L. Pham
(74) *Attorney, Agent, or Firm*—Robert A. Sabourin (57) ABSTRACT

A method for automatically determining an optimal imposition plan for printing and folding a product, the method including (a) calculating a plurality of imposition plans from a given set of input data including product specification data of the product, printing press data of a printing press for printing the product and folding machine data of a folding machine for folding the product and (b) selecting the optimal imposition plan from the plurality of imposition plans.

6 Claims, 5 Drawing Sheets

METHOD FOR AUTOMATICALLY DETERMINING AN IMPOSITION PLAN

This application claims the benefit of U.S. Provisional Application No. 60/411,729 filed on Sep. 18, 2002 and EP application no. 02102092.0 filed on Aug. 2, 2002.

FIELD OF THE INVENTION

The invention relates to the field of printing workflow systems, and in particular to imposition plans used in such systems.

BACKGROUND OF THE INVENTION

A pre-press workflow system, as disclosed e.g. in patent application WO 01/25907, may include several processes. One of these processes is imposition. As discussed in patent U.S. Pat. No. 6,046,818, imposition is the pre-press process of arranging the pages, that will be printed on the same sheet, in such a way that a proper sequence or position of each page relative to the other pages on the sheet is achieved. Arranging the pages is required because, when e.g. a book or a leaflet is manufactured, several pages of the book or leaflet are printed by the printing press on the same sheet. After printing, the sheet is folded and possibly cut and bound together with other processed sheets. In the resulting book or leaflet, the pages of course have to follow one another in the correct order; this is a job of the imposition process. Thus, the pre-press process of imposition is performed in view of post-press processes such as fold and cut operations.

An imposition plan represents the layout according to which the individual pages are arranged on a sheet, possibly including the relevant dimensions, i.e. the dimensions of the sheet, the dimensions of the individual pages and the dimensions of the spaces at the borders and between the individual pages on the sheet. To determine an imposition plan, several data have to be taken into account, such as the size of the sheet, the size of the individual pages, the possibilities of the press and of the folding machine that will be used.

It is customary to use a set of predefined imposition plans, often called imposition templates, to determine an imposition plan. Such a predefined imposition plan or imposition template gives the layout of the individual pages on the sheet without the dimensions. To select a suitable imposition template for a given print job, a user may be assisted by a computer program that shows a set of imposition templates. The user then selects an imposition template from this set and adds the relevant dimensions to the selected imposition template; usually the user is also assisted in this step by the computer program. The selection of the imposition template is based on the user's experience, on naming conventions (the names of the imposition templates may reflect the number of pages on a sheet and the binding method, e.g. "8-up saddle stitched") and very often on habit—most companies only use a very limited number of imposition templates. A company may use e.g. only four imposition templates that cover the majority of print jobs of the company; out of these four imposition templates, the user then selects the imposition template that will be used for a given job, based on his professional knowledge, i.e. his experience.

However, the imposition plan that was determined in this way is not necessarily optimal. If a sheet is used onto which 3×4 DIN A4 pages can be printed, for a page size somewhat smaller than DIN A4 the optimal imposition is not necessarily 3×4 ("3×4" means that three pages are arranged next to each other in, e.g., the width direction of the sheet, and four pages are next to each other in, e.g., the length direction of the sheet). Moreover, the imposition templates were set up for common cases and thus incorporate only some possibilities of common folding machines. Therefore, quite some possibilities of folding machines are not used at all.

There is thus a need for an improved method for determining an imposition plan.

SUMMARY OF THE INVENTION

The present invention is a method for determining an optimal imposition plan for printing and folding a product as claimed in independent claim 1. Preferred embodiments of the invention are set out in the dependent claims. Preferably, a method in accordance with the invention is implemented by a computer program.

In a method in accordance with the invention, the optimal imposition plan is selected from a plurality of imposition plans that are not predefined, as in the prior art, but that are calculated from a given set of input data. This set of input data preferably includes all relevant data for the product that is to be manufactured; the product may be a book that is to be printed on sheets that are subsequently folded, cut and bound. Advantageously, the given set of input data includes product specification data of the product (such as the size of the individual pages), printing press data of the printing press on which the product will be printed (such as the maximum possible sheet size on the press) and folding machine data of the folding machine on which the product will be folded (such as the maximum possible sheet size that can be handled by the folding machine, and the folding possibilities of the folding machine).

In this document, a "product" means a book, a leaflet, or any other object that requires a printing step and a folding step in order to be manufactured. E.g. a section (also called signature) of a book is also a product.

The product is printed on one or more "sheets". In this document, a "sheet" is also referred to as a "printing substrate". The printing substrate may be made of paper, cardboard, plastic, sticker material, etc. The term "sheet" encompasses a cut sheet as used for sheet-fed printing presses and a continuous printing substrate on roll as used for web printing presses.

An advantage of a method in accordance with the invention is that the obtained imposition plan is really an optimal imposition plan, instead of an approximation of the optimal imposition plan or an imposition plan that is considerably different from the optimal imposition plan. The set of input data may contain all possibilities of the folding machines, of the printing presses, etc. that are used. Therefore, all the possibilities of these devices may be taken into account in determining the imposition plan.

Another advantage is that the optimal imposition plan may be determined in an automatic way from the input data; this saves time and increases reliability.

Yet another advantage is that "just-in-time impositioning" becomes possible: in case of last minute changes of the input data, the imposition plan is quickly and easily recalculated.

In a preferred embodiment of the invention, the optimal imposition plan is determined from all possible imposition plans for a given set of input data. Simplified, the method may then be summarized as follows: generate all possible imposition plans; evaluate them with respect to a certain criterion; select the optimal imposition plan based on the evaluations. This method and its variants are discussed in detail further below. E.g., an optimal imposition plan may be determined in one, two or more steps. When using two steps, an initial set of imposition plans is reduced to a smaller set of imposition plans by a first, preliminary selection step; a second selection step then reduces the latter set of imposition plans to the optimal imposition plan.

As opposed to the prior art method of relying on the experience of the operator and/or the custom within the company, a fixed selection criterion may be used in a method in accordance with the invention. Some examples of a fixed selection criterion are minimum production cost of the product, minimum production time of the product, minimum use of the printing substrate on which the product is printed, minimum set up time of the press used to print the product, minimum set up time of the available machinery (presses, folding machines) used to print a plurality of products, optimal use of the available machinery and resources (such as the printing substrate).

Advantageously, a so called folding formula is used in representing an imposition plan. Some or all the imposition plans used in calculating the optimal imposition plan may be represented by folding formulae. As is discussed in detail further below, a folding formula indicates the folding order of a product and is suitable for setting up a folding machine.

A method in accordance with the invention may also include a cost calculation of the product that is manufactured.

If two or more printing presses and/or two or more folding machines can be used to manufacture a product, the product can be obtained via a number of routings along a printing press and a folding machine. The invention also includes a method to determine the optimal routing to manufacture a product, or a plurality of products.

The invention may be applied to sheet-fed printing presses and to web printing presses, fed by a printing substrate on roll.

Further advantages and embodiments of the present invention will become apparent from the following description and drawings.

BRIEF DESCRIPTION OF THE DRAWINGS

The invention is described with reference to the following drawings without the intention to limit the invention thereto, and in which.

DETAILED DESCRIPTION OF THE INVENTION

A method in accordance with the invention takes into account possibilities of folding machines. Therefore, first some characteristics of folding machines are discussed.

Figure 1:
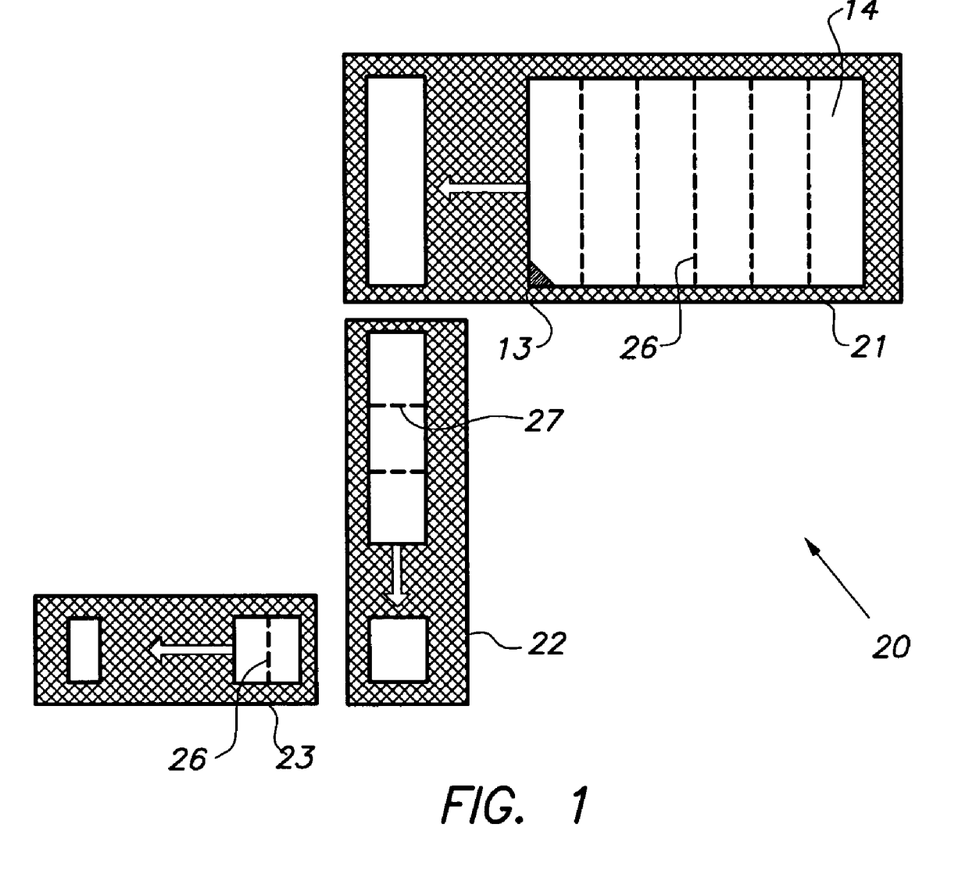
FIG. 1 shows a folding machine.

A folding machine folds flat printed sheets into sections, also called signatures. FIG. 1 shows a diagram of a folding machine 20 with three subsequent stages 21, 22 and 23. Sheet 14 is first folded in the first folding stage 21 along folding direction 26; corner 13 of sheet 14 acts as a reference corner 13, i.e. the sheet 14 is fed with one or both of its edges that are adjacent to corner 13 against stops of folding stage 21. Then, in the second folding stage 22, the already folded sheet 14 is further folded along another folding direction 27, perpendicular to folding direction 26; finally, the sheet 14 is folded in the third folding stage 23, again along folding direction 26. The obtained folded sheet 14 is called a section.

For each folding stage, a knife folder or a buckle folder (also called plate folder) may be used.

In a knife folder, a blunt-edged knife is set parallel with and above a slot formed by two rollers. The rollers revolve continuously so that when a sheet is placed over them and the knife descends, the sheet is caught between the rollers and carried away, a fold being made where the knife made contact. In practice the sheets are fed one at a time to stops, either by hand or by mechanical feeders, and are carried by moving tapes beneath the knife where they are precisely positioned mechanically for folding. The knife having descended, the sheet, now folded once, is carried by rollers and tapes to a second unit of knife and rollers where a second fold is made, then a third fold, etc., the folded sheets (now sections) being delivered to a stacker.

Figure 2A:
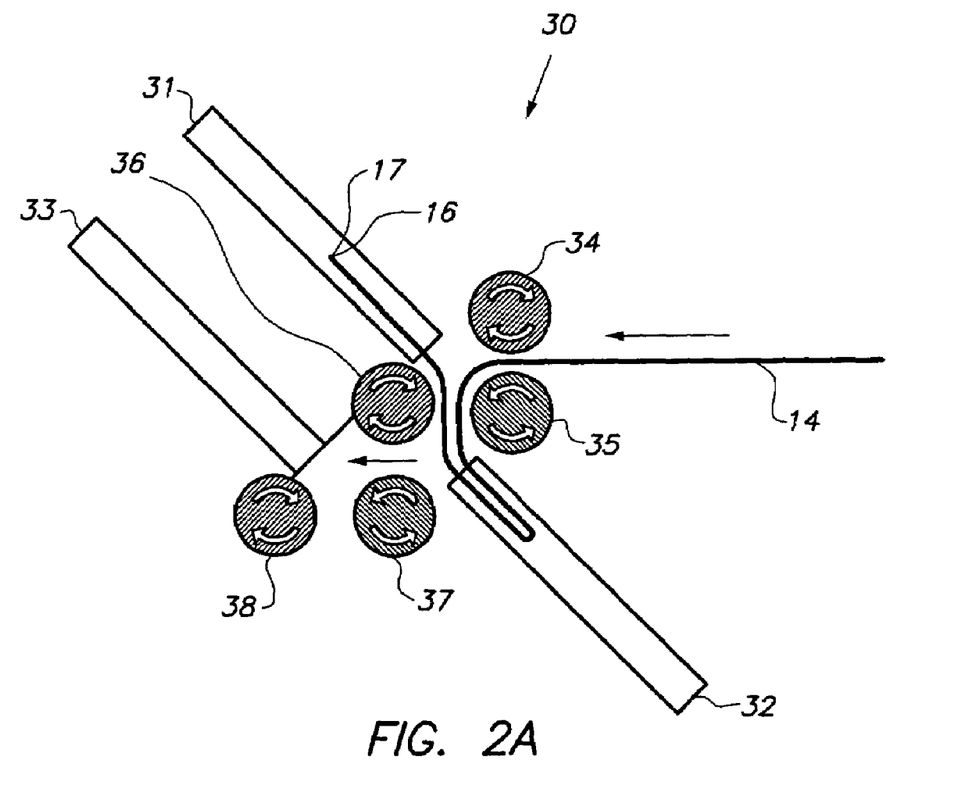
FIGS. 2A-2D show a buckle folder and the folding of a sheet therein.
Figure 2B:
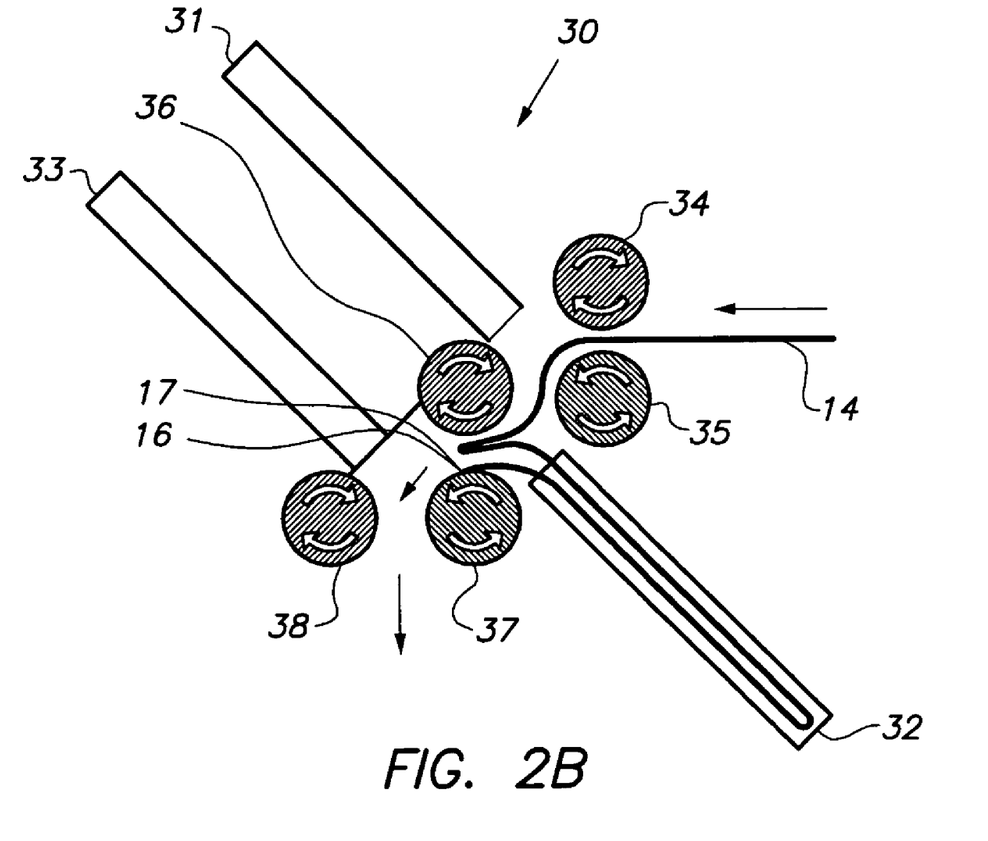
Figure 2C:
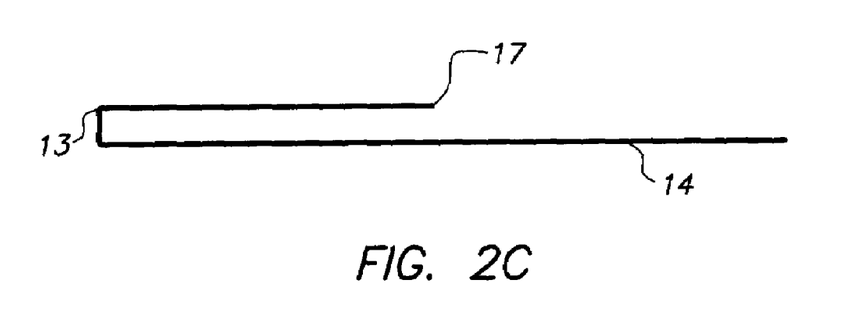
Figure 2D:
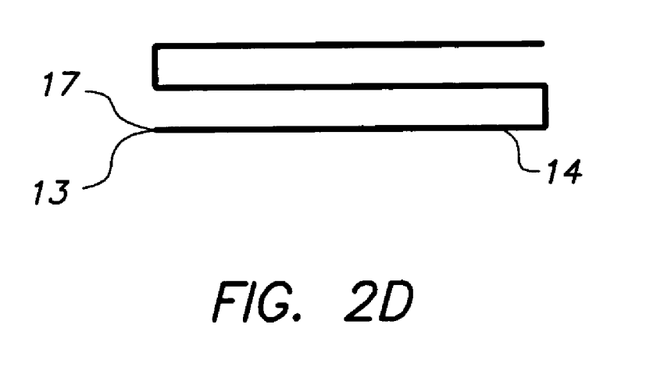

FIGS. 2A and 2B show a buckle folder 30, also called buckle-plate folder 30. Such a folder 30 works on a different principle. As illustrated by FIG. 2A, sheet 14 is fed with its leading edge 16 between a pair of continuously revolving rollers 34, 35. The leading edge 16 is guided between a pair of two closely spaced plates 31 (also called buckle plates 31), the plane of the plates 31 being at an angle of 45° to the plane of feeding. The plates 31 are fitted with internal adjustable stops, that are in FIG. 2A set to one third of the length of sheet 14. When the leading edge 16 of sheet 14 hits these stops, further forward motion is prevented. The latter portion of sheet 14, however, is still being propelled forward by rollers 34, 35 and, being already bent at an angle of 45°, sheet 14 buckles at the point of entry to the plates 31. The buckle is gripped between the lower roller 35 of the roller pair 34, 35 and a third roller 36 in contact with it and the buckle passes between these rollers 35, 36, thus forming a fold. The folded edge is deflected into a second pair of plates 32. When the stops of this second pair of plates 32 are hit, a second buckle is formed, as shown in FIG. 2B. The folded sheet 14, now having a zig-zag form, is propelled by rollers 36, 37 and then by rollers 37, 38 to leave the buckle folder 30. In FIG. 2B, the third pair of plates 33 is bypassed and thus is out of use. The resulting fold is a zigzag fold which is shown in FIG. 2D; the fold that was made by the first pair of buckle plates 31 is shown in FIG. 2C. The buckle folder 30 of FIGS. 2A-2B has two upper pairs of buckle plates 31, 33 and one lower pair of buckle plates 32. Current folding machines often have a first folding stage made up of four upper and four lower pairs of buckle plates. The available pairs of buckle plates may be set in use or may be bypassed, leading to different folds. Each pair of buckle plates in use produces an additional fold parallel to the first one.

In a preferred embodiment of the invention, the order of the folds and their location are represented in a way that is independent of the folding machine on which the folds will be performed, by means of so-called "folding formulae". A "folding formula" is a description that simply indicates the result that is to be achieved, e.g. "fold one third of the sheet upwards"; it does not indicate how a particular folding machine will attain this result. A folding formula is thus machine-independent.

A preferred notation of a folding formula is as follows:

$$L3U1 \qquad (1)$$

for the fold shown in FIG. 2C and performed by the first pair of buckle plates 31 in FIG. 2A, wherein one third of sheet 14 is folded upwards. In formula (1), "L3" means that the length of sheet 14 is divided into three equal parts, while "U1" means that one of these parts, i.e. one third of sheet 14, is folded upwards (as shown in FIG. 2C). Which part of sheet 14 is folded upwards is defined by choosing a reference corner 13 with respect to which the folding operation is performed. In this document, the actual lower left corner of the—unfolded or folded—sheet 14 is always taken as the reference corner 13 (this is just a matter of choice; any corner might have been taken as the reference). In FIGS. 2A-2D, reference sign 17 indicates the original reference corner of sheet 14, which may differ from the actual reference corner 13. As shown in FIG. 2C, after the L3U1 fold, the original reference corner 17 is located in the middle of the folded sheet 14, while the new, actual lower left corner 13 of the folded sheet 14 is taken as the new, actual reference corner 13.

Subsequently, one third of sheet 14 is folded downwards, with respect to reference corner 13. The result of the two subsequent folds is shown in FIG. 2D and may be indicated by:

$$L3U1D1 \qquad (2)$$

meaning that first one third of the sheet is folded upwards, "U1", and then one third of the sheet (i.e. one third of the original sheet length) is folded downwards, i.e. "D1" in formula (2).

The buckle-plate folder 30 shown in FIGS. 2A-2B has upper and lower pairs of buckle plates; as can be verified by means of FIGS. 2A-2D, an upper pair of buckle plates 31, 33 generates an upward fold, "U", while a lower pair of buckle plates 32 generates a downward fold, "D".

Since a folding formula simply indicates the result that is to be achieved, any fold or succession of folds, performed by a buckle folder, a knife folder or any kind of folder can be described by means of folding formulae. E.g. a folding stage wherein a sheet or a section is halved by means of a knife folder can be indicated by:

$$L2U1 \qquad (3)$$

Folding formulae unambiguously describe how a sheet has to be folded, thus filling a gap in the prior art. Moreover, folding formulae are machine independent and can directly be used to set up a folding machine.

The corresponding imposition plan can be deduced from the folding formula by means of a simple algorithm, as is discussed below. For every folding formula, there is a corresponding imposition plan; a folding formula is thus also a representation of an imposition plan.

Figure 3:
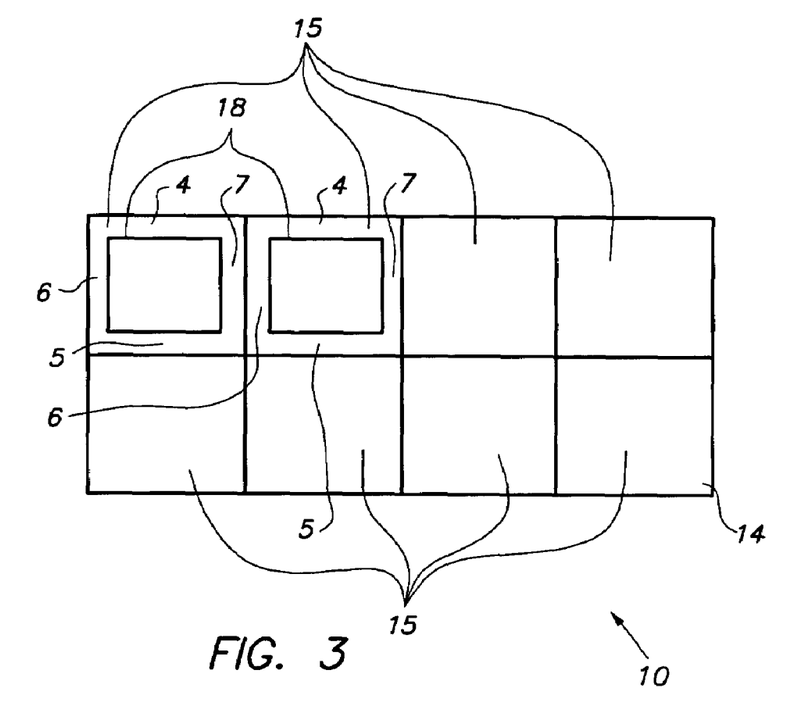
FIG. 3 shows the relation between an imposition page and a final page.
Figure 4:
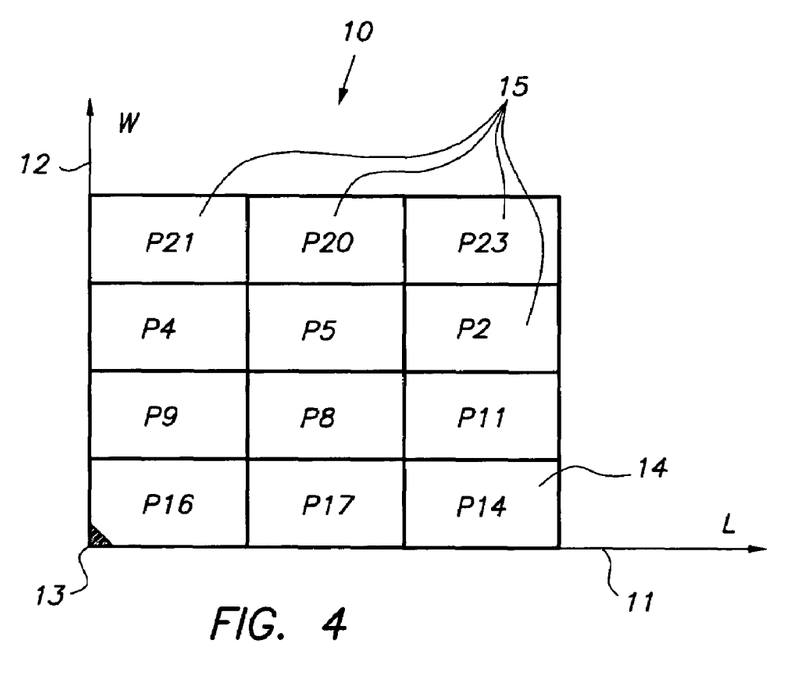
FIG. 4 shows an imposition plan.

In an imposition plan as shown in FIG. 4 the individual pages P21, P20, . . . P14 are arranged in such a way that after printing, folding and cutting, the pages follow one another in the correct order in the final product, such as a book. FIG. 4 shows so-called "imposition pages" 15; these are different from the final pages in the final product. In fact, extra space has to be added around the final pages in order to fold, collect/gather, bind and cut the product to the correct size in the final step. FIG. 3 illustrates the relation between a final page 18 and an imposition page 15: around a final page 18, a head trim 4, a foot trim 5 and spaces 6, 7 are added in order to obtain an imposition page 15. For products such as books, newspapers etc. units of two pages 18 are repeated in the imposition plan 10. The spaces 6, 7 are then calculated from spaces called the spine (which is the space, located at the spine of the book or newspaper, between two final pages), the front face trim, the front lip, the back face trim, the back lip, that are added to the right and/or to the left page of a two-page unit; however, this will not be discussed in detail since it is not necessary to understand the invention. In order to keep FIG. 3 readable, only two final pages 18 are shown in the drawing; in reality, each imposition page 15 contains a final page 18.

Returning now to FIG. 4, the shown imposition plan 10 contains 3×4 imposition pages 15: three imposition pages 15 are arranged next to each other in the length direction L of sheet 14, indicated by axis 11, while four imposition pages 15 are next to each other in the width direction W of sheet 14, indicated by axis 12. Axes 11 and 12 intersect in the reference corner 13 of sheet 14. Only four of the twelve imposition pages 15 are indicated by a reference sign, in order to keep the drawing readable. Typically, all folds in the imposition plan are located at a well defined fraction of the size of sheet 14: in FIG. 4, the fold lines are located at ⅓ and ⅔ in the length direction L and at ¼, ½ and ¾ in the width direction W. The location of the folds can thus indicated by giving the nominator of the fraction and the length and width of the sheet. The folding operation corresponding to the imposition plan 10 of FIG. 4, which includes the location of the folds, the folding direction and the folding order, can be indicated by:

$$L3U1U1W4U2U1 \qquad (4)$$

which means the following:

L3: there are three imposition pages 15 in the length direction L of the imposition plan 10;

U1: fold one part upwards; one "part" stands for one page in the length direction L, i.e. pages P16, P9, P4 and P21 taken together. After folding, the folded sheet or package has the size 4×2. The new reference corner is now the lower left corner of the package, i.e. the lower left corner of page P17;

U1: fold again one part upwards in the length direction; the new reference corner is the lower left corner of the package obtained so far, i.e. the lower left corner of page P14. The size of the package is now 4×1;

W4: there are four imposition pages 15 in the width direction W of the imposition plan 10. From now on, unless "L" would appear again, all folds apply to the W-direction;

U2: fold two parts upwards, in the width-direction. The new reference corner is the lower left corner of the package obtained so far, i.e. the lower left corner of page P2. The size of the package is now 2×1;

U1: fold one part upwards, in the width-direction. The new reference corner is the lower left corner of the package obtained so far, i.e. the lower left corner of page P23. The size of the package is now 1×1.

The pages on the folded package can now be numbered by hand, from "P1" to "P24" (both the front sides and the back sides of the individual pages of the folded package are numbered; there are thus 2×3×4=24 pages). In a preferred embodiment, the pages are numbered by means of a simple computer program simulating the folding process, the successive steps of which are given above. Unfolding the package, either by hand or by means of a computer simulation, returns the imposition plan 10 shown in FIG. 4 wherein the page numbers are indicated by "P21", "P20", etc. (remark: the page numbers on the back side of sheet 14 are not shown in FIG. 4).

Figure 5A:
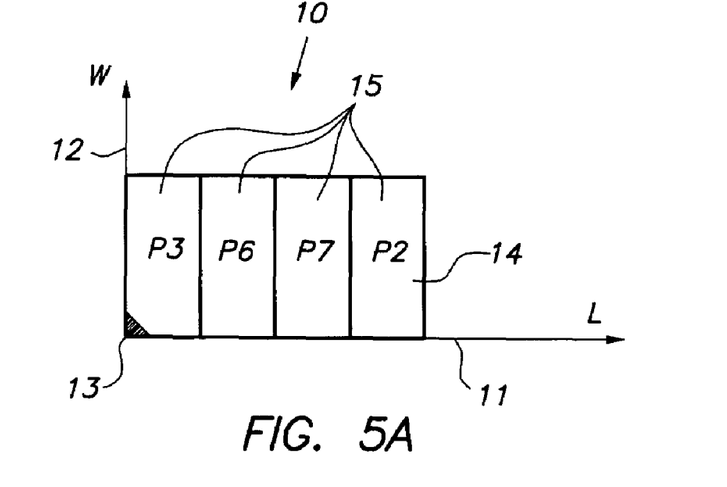
FIGS. 5A and 5B show imposition plans.
Figure 5B:
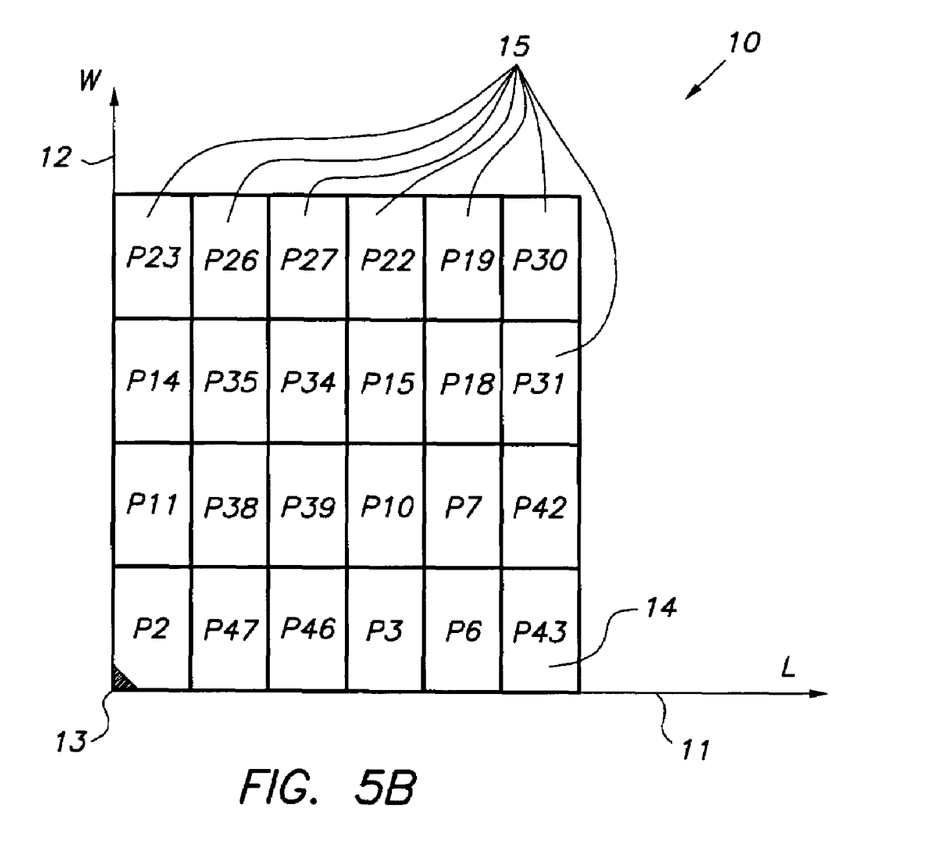

Other imposition plans are shown in FIGS. 5A and 5B. The folding operation corresponding to the imposition plan of FIG. 5A can be indicated by:

$$L4U2U1 \qquad (5)$$

while the folding operation corresponding to the imposition plan of FIG. 5B can be indicated by:

$$L6U2D2W4U1D1U1LD1 \qquad (6)$$

In formula (6), "LD1" is indicated. Instead, "L2D1" could also have been indicated; however, the size in the L-direction can be deduced from "L6U2D2" and thus does not have to be given again.

Now, a preferred embodiment of calculating a plurality of imposition plans from a given set of input data is discussed. First, an overview of the calculation method of this embodiment is given. The overview is followed by an example with numerical data.

The calculation method, which is preferably implemented by means of a computer program, can be divided into four steps:

1) Calculate the maximal imposition, taking into account the product specification data and the possibilities and restrictions of the folding machine and of the printing press. If the sheets have a grain direction, which is the case for paper, this direction is also taken into account. The "grain direction" is the direction in which the majority of the fibers are aligned within a sheet. It is strongly preferred, in paper products such as books, that the spine of the product is parallel to the grain direction; this avoids post-binding problems such as warping.

In case the grain direction of the sheets can still be chosen, the maximal imposition is calculated for both "wide web" (WW) and "narrow web" (NW) sheets. In a "wide web" sheet, the grain direction is perpendicular to the long edge of the sheet (supposing that rectangular sheets are used, as is usual); this allows arranging a larger number of pages next to each other—with the spine between two pages parallel to the grain direction—than in a "narrow web" sheet, wherein the grain direction is perpendicular to the short edge of the sheet.

2) Calculate both for wide web and for narrow web sheets:
   a) the number of sections with the maximal imposition, as determined in step 1;
   b) the number of remaining sections (if any) with another (smaller) imposition;
   c) the required number of press setups and the number of sheets that have to be printed.

3) Calculate for every imposition under step 2, and depending on the sheet selection criteria (e.g. the sheet dimensions are given and the grain direction is fixed; or, alternatively, the sheet dimensions and the grain direction are to be determined):
   a) the optimal sheet dimensions, i.e. the sheet length and width, and the optimal grain direction, i.e. WW or NW. In determining the optimal grain direction, one or more criteria may be used, such as: select the grain direction that leads to the smallest number of press setups (so as to minimize the setup time); if the number of press setups for WW and for NW are equal, select the grain direction corresponding to the smallest number of sheets that have to be printed (which results in the smallest run time of the press);
   b) the number of sections and the imposition plan;
   c) the number of sections per sheet;
   d) select the three best folding formulae for the maximal imposition and (if applicable) for the other (smaller) imposition, as follows:
      i) determine all possible folding formulae for the maximal imposition (and, if applicable, for the other, smaller imposition), taking into account which fold types are allowed: a half fold (H)—as produced e.g. by a knife folder; a zigzag fold (Z), also called z-fold—as shown e.g. in FIG. 2D; a wind fold (W), also called letter fold—having a spiral form, so that the last of the three portions of the folded sheet is located between the first and the middle portion; the corresponding asymmetrical fold types: h, z and w—asymmetrical folds are used in case of an odd number of pages, wherein the sheet is e.g. "halved" (h) by folding two parts out of five upwards. Remark: the determination of all possible folding formulae (and hence of all possible imposition plans) is a logical combinatorial problem, that can typically be solved by a computer program. E.g. one page (or part) can be obtained from four pages (or parts) by means of the following basic possibilities: (H) method "U2U1", (Z) methods "U1D1U1" and "U3U1D1", (W) methods "U3D1D1" and "U1U1U1"; complementary possibilities can be found by replacing "U" by "D" and vice versa, resulting in: (H): "U2D1", "D2U1" and "D2D1", (Z): "D1U1D1" and "D3D1U1", (W): "D3U1U1", "D1D1D1";
      ii) determine the criteria to be used, e.g.:
         after a wind fold (W), the sheet is not folded again in the same direction but in the other direction;
         avoid asymmetrical fold types (hzw) and the difficult wind fold (W);
         preferably end by a half fold (H) if there are at least three folding stages;
         preferably use the upper pairs of buckle plates in a buckle folder (easier to set up);
         but other strategies may also be used, e.g. minimize the number of folds;
      iii) determine a score for every folding formula; the score is obtained by evaluating the folding formula with respect to the used criteria, and giving bonus points or penalty points (e.g. five penalty points for every wind fold (W));
      iv) select the three folding formulae having the highest scores.

4) Calculate the "runlist", which is a table having the following columns, covering all pages in the product:
   a) the section number;
   b) the start and end page numbers at the front side;
   c) the start and end page numbers at the back side;
   d) the number of pages;
   e) a number identifying the imposition of the section.

The optimal imposition plan can now be chosen from the three imposition plans corresponding to the three folding formulae having the highest scores. Alternatively, in step 3)d)iv) above, only a single folding formula having the highest score is selected.

EXAMPLE

Input data for a computer program implementing the invention: Product specification data, including finishing data:
  double sided
  paper
  60 pages
  1000 copies
  not bound
  DIN A4 pages
  head trim: 3 mm
  foot trim: 3 mm
  spine: 0 mm (remark: this is a fictitious example)
  back face trim: 2 mm
  back lip: 5 mm
  front face trim: 2 mm
  front lip: 0 mm Paper Grain Direction:
  choice between WW and NW paper by the computer program

| Printing press data: | |
|---|---|
| maximum sheet size: | 760 mm × 1260 mm |
| non-available strip at gripper edge: | 27 mm |
| strip for side marks: | 10 mm |

-continued

| Folding machine data: | |
|---|---|
| maximum sheet size: | 600 mm × 1500 mm |
| maximum number of folding stages: | 3 |
| folding stage 1: | UDUD |
| folding stage 2: | UD |
| folding stage 3: | U |
| fold types: | HZhz |

Results of the Computer Program:

Results of Step 1:

| | |
|---|---|
| WW: | 1 × 4 pages |
| NW: | 4 × 2 pages |

Results of Step 2:
WW:
7 sections with an imposition 1×4, called "imposition 1" (for WW); thus 8 pages per "imposition 1", making a total of 56 pages for the 7 sections;
1 section with an imposition 1×2, called "imposition 2" (for WW); thus 4 pages per "imposition 2", resulting in a grand total of 60 pages (which is the number of pages of the product) for the 7+1 sections. Remark: on one sheet, either one imposition "imposition 1" or two impositions "imposition 2" can be printed;
8 press setups are required and 7500 sheets have to be printed:
(56*1000 copies)/8=7000 sheets for imposition 1;
(4*1000 copies)/(4*2)=500 sheets for imposition 2 remarks:
  two impositions "imposition 2" are printed on the same sheet, as remarked above, hence the "2" in "(4*2)";
  that these two impositions are printed on the same sheet means that an extra cutting step is involved—an additional criterion could be to avoid such additional cutting steps;
NW:
3 sections with an imposition 4×2, called "imposition 1" (for NW); thus 16 pages per "imposition 1", making a total of 48 pages for the 3 sections;
1 section with an imposition 3×2, called "imposition 2" (for NW); thus 12 pages per "imposition 2", resulting in a grand total of 60 pages for the 3+1 sections;
4 press setups are required and 4000 sheets have to be printed (these sheets are larger than the ones used for the WW case and now two different sheet sizes are used):
(48*1000 copies)/16=3000 sheets for imposition 1;
(12*1000 copies)/12=1000 sheets for imposition 2.

Results of step 3:

| for imposition 1: | |
|---|---|
| a) optimal sheet size: | 459 mm × 1299 mm, NW |
| b) number of sections, and imposition: | 3 sections, 4 × 2 |
| c) number of sections per sheet: | 1 |
| d) the three best folding formulae with their score: | L4U2U1W2U1, score 194 |
| | L4U2U1W2D1, score 192 |
| | L4U2D1W2U1, score 192 |

| for imposition 2: | |
|---|---|
| a) optimal sheet size: | 459 mm × 919 mm, NW |
| b) number of sections, and imposition: | 1 section, 3 × 2 |
| c) number of sections per sheet: | 1 |
| d) the three best folding formulae with their score: | L3U2U1W2U1, score 194 |
| | L3U2U1W2D1, score 192 |
| | L3U2D1W2U1, score 192 |

Results of step 4:

| Section number | Page numbers Front | Page numbers Back | Number of pages | Imposition number |
|---|---|---|---|---|
| 1 | 1-8 | 9-16 | 16 | 1 |
| 2 | 17-24 | 25-32 | 16 | 1 |
| 3 | 33-40 | 41-48 | 16 | 1 |
| 4 | 49-54 | 55-60 | 12 | 2 |

In calculating a plurality of imposition plans from a given set of input data, it is preferred also to vary the print direction: a rectangular sheet may pass through the press in two different directions, viz. short edge first and long edge first (if allowed by the maximum dimensions on the press). For the same sheet, with specific dimensions and grain direction, varying the print direction may result in a different optimal imposition plan.

The sheet thickness may also be taken into account; a large thickness may affect the position of the folding lines.

As mentioned already above, either the printing substrate, including its dimensions, is given, or the optimal printing substrate data are calculated; in the latter case, the printing substrate can be ordered, based on these optimal data.

"Multiple delivery" may also be taken into account. If e.g. some pages of the product have to be printed in color, using a four color press, and other pages are to be printed in black-and-white only, on a single color press, all color pages may be arranged on the same sheet, even if the color pages occur in different sections. Thus, by printing all color pages by means of a single printing plate (or a minimal number of printing plates), the number of passages through the press (or presses) for the product is minimized, resulting in lower production cost.

From what is set out above, it will be clear to a person skilled in the art that an optimal imposition plan can be calculated, according to specific criteria, from a plurality of imposition plans, or from all possible imposition plans for a given set of input data. The calculation may result in one or more optimal imposition plans; "selecting an optimal imposition plan", as claimed in claim 1, encompasses both the case wherein the calculation results in a single imposition plan and the case wherein more imposition plans result from the calculation. Moreover, an optimal imposition plan may comprise several "part-imposition-plans", such as "imposition 1" and "imposition 2" in the example above.

The folding formula corresponding to the optimal imposition plan may be used to set up a folding machine. Thus, the invention makes it possible both to determine the optimal imposition plan and to send data, resulting from the calculation of the optimal imposition plan, to the folding machine to control it.

As discussed above, in a method in accordance with the invention the input data preferably comprise data of a "printing press" and data of a "folding machine". The "printing press" may either be a real, existing machine or a "virtual" machine that does not exist but that has characteristics that are e.g. typical for a number of existing printing presses; the same holds for the "folding machine".

The invention may also be applied to a web printing press, fed by a continuous printing substrate on roll. In this case, a sheet size is determined for the web printing substrate, and this sheet size is used in determining a plurality of imposition plans from which the optimal imposition plan will be selected. E.g. a web printing press for newspaper printing, that has several webs, is considered as a composite machine comprising a plurality of printing presses and a built-in folding machine. In a preferred embodiment pertaining to this case, a "sheet" has a width equal to the width of a printing drum and a length equal to the circumference of the printing drum. For one such sheet, several printing plates may be required (e.g. if two or more printing plates are mounted on the same drum).

More information on web printing presses and on suitable folders can be found in the "Handbook of Print Media", Helmut Kipphan (Ed.), Springer Verlag, 2001, ISBN 3-540-67326-1, in section 2.1.3 "Web-fed Offset Printing" and in section 2.1.3.4 "Folders and Print Product Variation".

A method in accordance with the invention may also include a cost calculation of the product that is to be manufactured. In fact, as set out above, a method for determining an optimal imposition plan in accordance with the invention preferably includes one or more criteria that are related to the cost of the product. In the example discussed above, the number of press setups and the number of sheets that are to be printed are determined from the imposition plans (or from the corresponding folding formulae). Thus, the setup time and the run time are known and the corresponding costs can be calculated. It is therefore possible to determine an optimal imposition plan so as to minimize the cost of the product that is manufactured. It is also possible to use a method in accordance with the invention in the estimating phase to determine the production cost for non-standard printing jobs and to make an offer for a client.

Determining the optimal imposition plan for a given printing press, on which the product will be printed, and for a given folding machine, on which the product will be folded, only takes about one second on a personal computer (PC) when using a computer program according to the invention. It is therefore also possible, and feasible, to determine the optimal routing—i.e. on which press will the product be printed and on which folding machine will it be folded—if two or more printing presses and/or two or more folding machines are available, so that the product can be manufactured via several routings. The calculation of the optimal imposition plan is then simply repeated for all combinations of a printing press and a folding machine, and of these combinations, the best imposition plan is selected, i.e. the imposition plan that best satisfies the selection criterion. The result of this global calculation is an optimal routing with associated imposition plans. An advantage of such a global calculation is that the production planning department can determine the optimal routings for all products that are to be manufactured at a given time. If input data for the planning change, the calculation can be redone using the new input data. For each product, the optimal imposition plans are obtained together with the optimal routing.

The optimal routing can e.g. also be determined for all sections of a book, section per section. Extra constraints may be taken into account, such as that a particular product is not to be printed on a particular printing press. Data concerning the binding and/or cutting operations may also be used. The invention can thus not only be applied for pre-press but also for planning.

The invention can also be applied if two or more presses are required to print the product and/or two or more folding machines are required to fold the product.

In what is set out above, the main starting point is a product or a plurality of products that are to be manufactured. However, one can also start from the machinery (printing presses, folding machines, possibly cutting and binding machines) that is available to manufacture the plurality of products, and optimize the use of the available machinery. If e.g. two printing presses are available, the printing jobs, that correspond to the plurality of products, may be allocated to the printing presses in such a way that e.g. the total throughput through the two presses is maximized or the total cost is minimized. For the plurality of products that have to be manufactured, data such as the setup time and the run time can be calculated for all these products, based on the calculation of the imposition plans as set out above. A method in accordance with the invention may therefore also include an optimization of the use of the available machinery, and possibly also the available resources (what types of printing substrate are available, is it possible to order additional quantities and/or types of printing substrate, etc.).

Those skilled in the art will appreciate that numerous modifications and variations may be made to the embodiments disclosed above without departing from the scope of the present invention.

List of Reference Signs
4: head trim
5 foot trim
6: space
7 space
10: imposition plan
11: axis
12: axis
13: actual reference corner
14: sheet
15: imposition page
16: edge
17: original reference corner
18: final page
20: folding machine
21: stage
22: stage
23: stage
26: direction
27: direction
30: buckle folder
31: buckle plate
32: buckle plate
33: buckle plate
34: roller
35: roller
36: roller
37: roller
38: roller

The invention claimed is:

1. A method for determininig (i) on a data procesing system, (ii) in a computer program or (iii) on a computer readable medium, an optimal routing for manufacturing a printed product, the method comprising:
selecting a printing device from a first group of printing devices for printing said product, the first group comprising at least one device;
selecting a folding device from a second group of folding devices for folding said product, the second group comprising at least one device; wherein the first and the second group together comprise at least three devices;

calculating a plurality of imposition plans from a given set of input data including product specification data of said product, printing press data of said selected printing device and folding machine data of said selected folding device;

determining, from said plurality of imposition plans, a specific optimal imposition plan for said product;

repeating said determination of said specific optimal imposition plan for all combinations of printing devices of said first group and folding devices of said second group, thus obtaining a plurality of specific optimal imposition plans for said product;

determining an optimal imposition plan from said plurality of specific optimal imposition plans for said product, thus obtaining said optimal routing for said product, said optimal routing comprising (i) an optimal printing device out of said first group of printing devices and associated with said optimal imposition plan and (ii) an optimal folding device out of said second group of folding devices and associated with said optimal imposition plan.

2. The method according to claim 1 wherein said plurality of imposition plans are all possible imposition plans for said given set of input data.

3. The method according to claim 1 further comprising:
representing each imposition plan of said plurality of imposition plans as a folding formula indicating a folding order of said product and suitable for setting up a folding machine.

4. The method according to claim 1 wherein said plurality of imposition plans are all possible imposition plans for said given set of input data.

5. The method according to claim 1 further comprising: determining said specific optimal imposition plan from said plurality of imposition plans by means of a selection criterion that is selected from the group consisting of minimum production cost of said product, minimum production time of said product and optimal use of available machinery and resources.

6. The method according to claim 1 further comprising: representing each imposition plan of said plurality of imposition plans as a folding formula indicating a folding order of said product and suitable for setting up a folding machine.

* * * * *